Feb. 28, 1961 G. R. PAVLICK 2,972,858
EXHAUST AREA CONTROL FOR GAS TURBINE ENGINES
Filed Nov. 5, 1956 2 Sheets-Sheet 1

INVENTOR.
GEORGE R. PAVLICK
BY
Robert C. Smith
ATTORNEY

Feb. 28, 1961    G. R. PAVLICK    2,972,858
EXHAUST AREA CONTROL FOR GAS TURBINE ENGINES
Filed Nov. 5, 1956    2 Sheets-Sheet 2
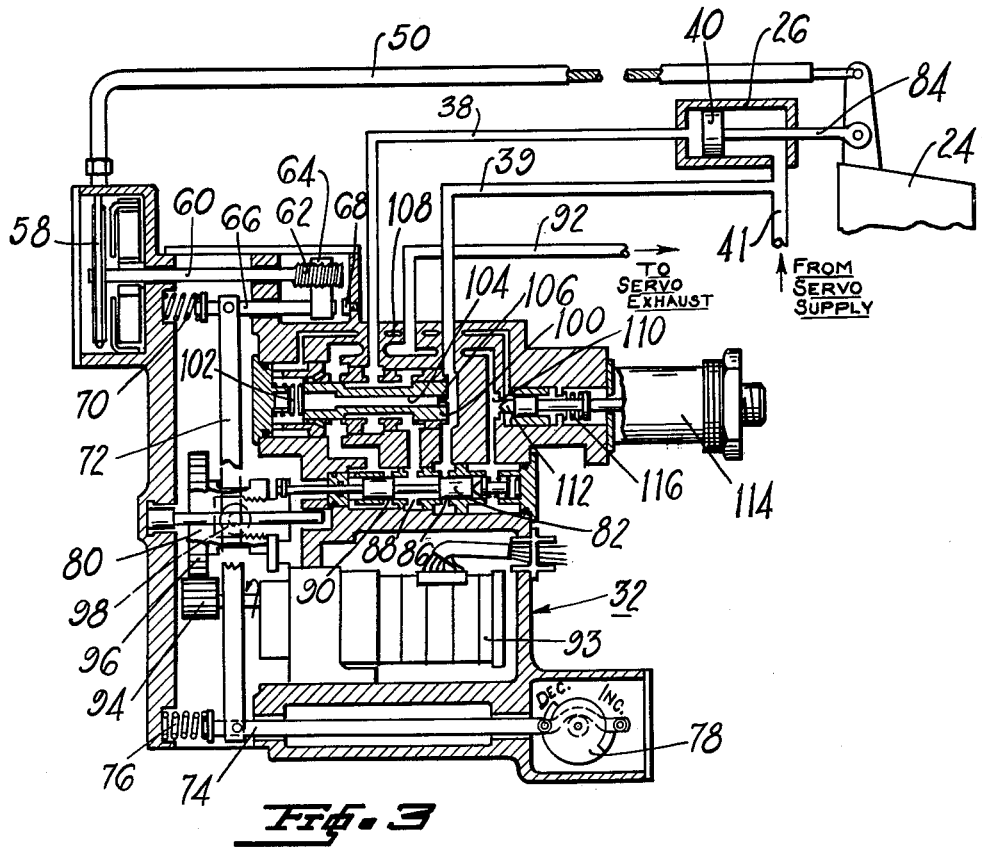
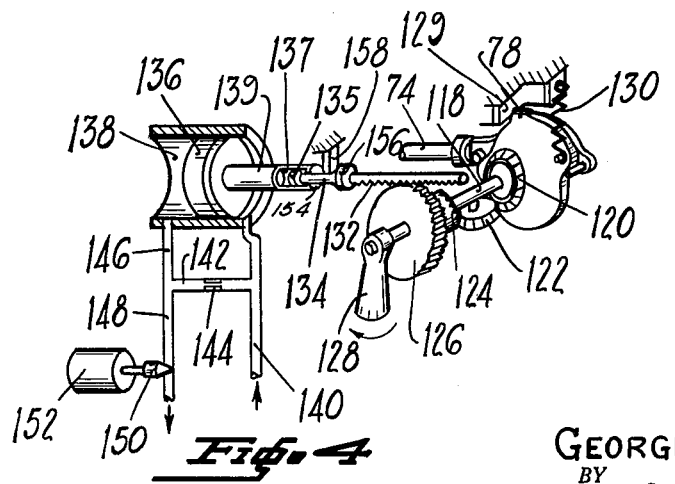
INVENTOR.
GEORGE R. PAVLICK
BY
Robert C. Smith
ATTORNEY United States Patent Office 2,972,858
Patented Feb. 28, 1961

2,972,858

EXHAUST AREA CONTROL FOR GAS TURBINE ENGINES

George R. Pavlick, South Bend, Ind., assignor to The Bendix Corporation, a corporation of Delaware Filed Nov. 5, 1956, Ser. No. 620,405

12 Claims. (Cl. 60—35.6)

The present invention relates to controls for turbo-jet engines and more particularly to a system for controlling the area of the exhaust jet or nozzle of a gas turbine engine.

Control of the exhaust jet of a gas turbine engine requires that the system must be instantly responsive to changes in value of certain engine operating conditions such as tailpipe temperature. In the present system, it is also required that the system operate in such manner as to impose the least possible limitation on the pilot's request for power. It is also desirable that the control be as simple and straightforward as possible consistent with handling the control functions involved.

It is, therefore, an object of the present invention to provide an exhaust area control system for a gas turbine engine which is adapted to receive request and control signals from a number of sources and discriminate among these signals to operate a hydraulic area varying mechanism.

It is another object to provide an exhaust area control which is responsive to throttle request but subject to the overriding effect of a speed lock-out mechanism.

It is another object to provide an exhaust area control which incorporates a novel means for coordinating a speed lock-out means and a throttle request.

It is a further object of the present invention to provide an exhaust area control which accomplishes the above objects and which also incorporates an emergency system which operates to establish a certain desired area condition upon the occurrence of a power failure in the main control system.

Other objects and advantages will become apparent from the following specification taken in connection with the accompanying drawings in which:

Figure 3 is a sectional view of my exhaust area control; and

Figure 4 is a perspective view of the speed lock-out and throttle request mechanism used in conjunction with the structure shown in Figure 3.

Figure 1:
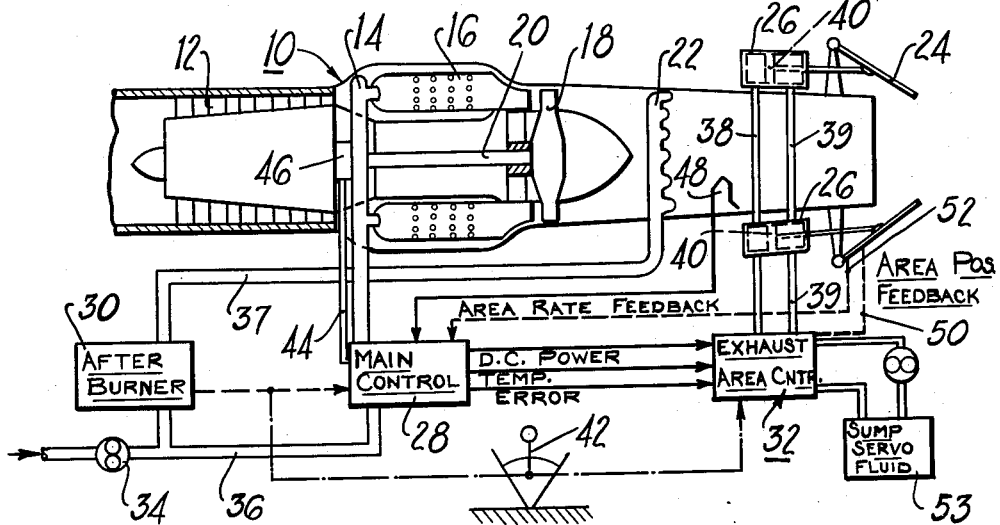
Figure 1 is a block diagram showing the manner in which my exhaust area control system is incorporated in an over-all gas turbine control system including main control, afterburner control, and exhaust area control.

Referring to Figure 1, a gas turbine engine is shown generally at numeral 10 having a compressor 12, a fuel manifold 14, a plurality of combustion chambers 16, a turbine 18 connected to the compressor 12 by means of a shaft 20, an afterburner fuel manifold 22 and an exhaust area control consisting of a tailgate structure 24 and a plurality of hydraulic cylinders 26. A control system for controlling the operation of engine 10 is shown including a main fuel control 28, an afterburner control 30 and an exhaust area control 32. Fuel is supplied to the engine manifold 14 by the main control 28 which meters fuel supplied to it from a source, not shown, by means of a pump 34 which pressurizes fuel in a conduit 36. The afterburner manifold 22 is supplied with fuel through a conduit 37 connected to the afterburner control 30 which also receives a fuel from pump 34. It is the function of the exhaust area control 32 to control the hydraulic pressure applied through a pair of conduits 38 and 39 against the pistons 40 in the hydraulic cylinders 26 to thereby control the effective area of the tailgate or exhaust area varying structure 24. A pilot's throttle lever 42 is coordinated to provide request signals to each of main control 28, afterburner control 30 and exhaust area control 32. The exhaust area control 32 receives a number of input signals from the main control 28 which may be of the type shown in copending application Serial No. 402,976, filed in the name of Warner C. Wintrode (common assignee). The main control 28 is connected to the turbine shaft 20 through any of a number of means well known in the art. In the present instance, a direct mechanical connection 44 is shown between a gear box 46 and the main control 28 for providing a signal to the main control system which is directly responsive to engine rotational speed. Also supplied to main control 28 is an electrical signal responsive to engine tailpipe temperature which is supplied by means of a thermocouple 48. The main control system 28 provides the exhaust area control with input signals varying with engine speed and temperature error as well as a source of direct current power. Also supplied as an input to exhaust area control 32 is a direct mechanical connection from tailgate 24 through a cable 50 which provides an area position feedback. Area rate feedback is supplied by a mechanical linkage 52 to the main control 28. This rate function is not shown in the Wintrode application, supra, but may be incorporated as shown in the application Serial No. 560,670, filed in the name of Norman K. Peters et al. (common assignee). In that application a simple mechanical link is used to drive a slider on a potentiometer and the voltage thus selected is supplied to a standard rate or differentiating circuit of a kind well known in the art. This area rate feedback provides a stabilizing function on the temperature error signal supplied to the exhaust area control 32. The exhaust area control acts to control the effective pressure of the servo supply fluid from a servo supply sump 53 against the piston 40.

Figure 2:
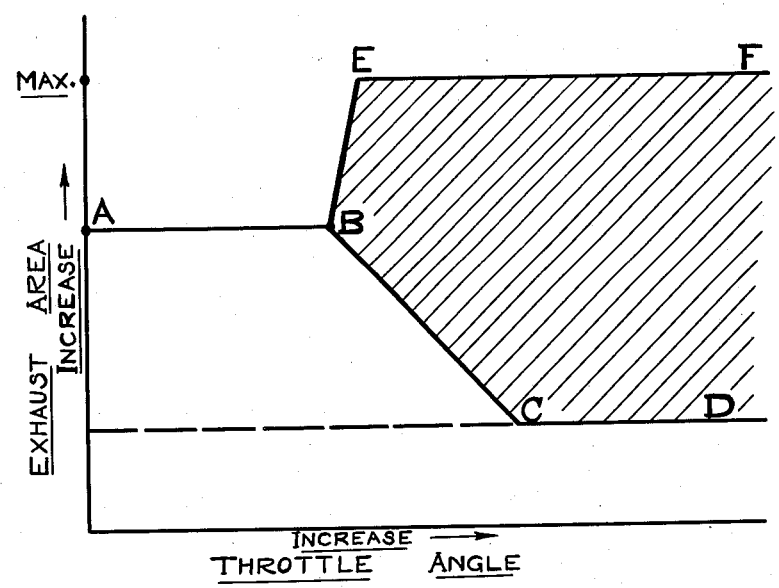
Figure 2 is a graph showing the operating characteristics of my exhaust area control system.

It is the function of the control system described therein to cause the exhaust area of the engine to be controlled in accordance with the operating characteristic shown graphically in Figure 2. In Figure 2 a graph is shown in which exhaust area is plotted on the vertical axis and throttle angle on the horizontal axis. It will first be assumed that the engine is started and idling and the exhaust area is maintained at a mechanical schedule which holds the area in a moderately open position as shown at point A. Upon an increase in throttle angle the exhaust area would follow a pattern shown by curve A—B—C—D. This curve is very similar to the curve of exhaust area versus engine speed and for the purposes of this discussion it must be assumed that the throttle angle is chosen for steady state rather than transient conditions. It will thus be seen that up to a certain given throttle angle, which corresponds to a certain speed the exhaust area is maintained in a relatively open position as shown on curve A—B. At point B the speed lockout, which will be described later, becomes inoperative and the exhaust area control acts to reduce the area as shown on line B—C. When the minimum area is reached this area is maintained irrespective of further increases in speed or throttle angle as shown by the curve C—D. At any point of the curve beyond point B, however, it is possible that an overtemperature condition may develop in the tailpipe of engine 10 necessitating that the exhaust area control act to open the tailgates 24. When an overtemperature condition is experienced, the thermocouple 46 provides an overtemperature signal to the main control system which compares this signal with a reference and produces an error signal of a proper polarity to cause the exhaust area control mechanism to increase the area and thus bring the temperature back within its proper limit. Because of this overtemperature limiting function, the exhaust area may, at any time operation is established to the right of point B, be anywhere within the shaded area bounded by curves B—C—D and B—E—F.

Referring now to Figure 3 my exhaust area control system is shown generally in a housing to which I have designated numeral 32. It is the function of the mechanism shown in housing 32 to control the operation of the tailgate structure 24 through actuation of the hydraulically controlled pistons 40 in cylinders 26. Inasmuch as all the cylinders and pistons are supplied and controlled in the same manner, only one of each has been shown. Servo fluid is applied to one side of piston 40 through a conduit 41 and to the other side through the conduits 38 and 39. The area position feedback is transmitted to control 32 from tailgate 24 through the action of the cable 50. The feedback cable 50 acts on a pulley 58 to control the rotation of a shaft 60 having a worm gear 62 formed thereon. A follower member 64 is attached to a shaft 66 which is movable between a stop 68 and a spring 70. Pinned to shaft 66 is a lever 72 which is, in turn, pinned at its opposite end to a shaft 74 which is axially movable between a spring 76 and a cam 78. At its center, lever 72 is attached to a carriage structure 80 which operates to position a servo valve 82. It is the function of servo valve 82 to control the flow of high pressure servo or servo supply fluid from the supply sump 53 to the left side of piston 40 in cylinder 26. This high pressure is always effective against the right side of piston 40. Because of the area of piston rod 84 it will be apparent that there is a differential in effective area on opposite sides of piston 40. Therefore, if supply pressure is directly applied to both sides of piston 40 the greater effective force will be on the left side tending to move the nozzle in the opening direction. As illustrated, the servo valve is in a null position, blocking any flow either into or out of the left chamber of cylinder 26. If servo valve 82 is moved to the right of the position illustrated, the full servo supply pressure will be provided through conduit 39, a pair of ports 86 and 88 into conduit 38 and against the left side of piston 40. When the servo valve 82 is moved to the left of the position illustrated the servo supply pressure is permitted to reach only the right side of piston 40 and the fluid pressure on the left side of the piston 40 is dumped out through conduit 38, through passage 88, a passage 90 and into a servo exhaust passage 92. The piston 40 is therefore moved in a closing direction. From the foregoing it will be understood generally that the area request is fed into the system through an axial movement of shaft 74 which causes lever 72 to pivot about its upper end thereby positioning servo valve 82 in such manner as to cause the variable area mechanism to be moved either in an opening or closing direction. Upon a movement of the mechanism 24 the feedback cable 50 causes a rotation of pulley 58 and shaft 60 which results in a movement of shaft 66 and thence a rotation of the lever 72 about its lower end to cause the servo system to be stabilized at a new position of the tailgate member 24.

Also housed in control unit 32 is a two-phase electric motor 93 which is electrically connected to the main control 28 in such manner that it receives temperature error signals. Motor 93 carries a gear 94 which drives a gear 96 forming part of carriage 80. Upon the occurrence of temperature error signals indictive of overtemperatures in the tailgate of engine 10, motor 93 rotates, thus causing a rotation of a driven gear 96. Member 96 is threadedly engaged with a member 98 which is restrained from rotation and is therefore caused to move in an axial direction thereby moving servo valve 82 axially. It will thus be seen that the overtemperature system is capable of moving servo valve 82 independently of either the request or the area position feedback mechanism. Movement of servo valve 82 will cause tailgate structure 24 to open or close in the manner described.

Positioned in fluid series with the servo valve 82 is an emergency valve 100 which is spring-loaded at its left end by means of a spring 102 and is subjected on both ends to servo supply pressure from conduit 39. The valve 100 has a passage 104 axially positioned through its center and a restriction 106 in the right end of said passage. The servo pressure on the left end of valve 100 is in communication through a passage 108 with the exhaust pressure in a passage 110 which, in turn, dumps into exhaust passage 92. Communication between passages 108 and 110 is controlled by means of a valve 112 operated by means of a solenoid 114. Solenoid 114 is supplied with direct current power from the main control 28 and during normal operation it is maintained in an energized condition thereby blocking communication between passages 108 and 110. In the event of a power failure the power to solenoid 114 is interrupted causing the solenoid to become deenergized and valve 112 is moved away from its seat through the action of a small spring 116. This causes the supply servo pressure appearing on the left side of emergency valve 100 to be dumped out through passages 108 and 110 into exhaust passage 92. Because of the restriction 106 there then exists a substantial pressure differential on opposite sides of emergency valve 100 which causes said valve to be moved to the left against the force of spring 102. When the emergency valve 100 is moved to the left of the position illustrated, the passage 38 is placed in communication with the passage 92 thereby dumping the pressure on the left side of piston 40 and causing the exhaust nozzle mechanism 24 to be moved in a closing direction.

Referring now to Figure 4, it will be observed that shaft 74 is connected to the cam 78. This cam is mounted on a shaft 118 in such manner that it may rotate with respect to said shaft. A set of differential gears are also carried on said shaft including a bevel gear 120 attached to cam 78, an additional bevel gear 122 attached to shaft 118, and a bevel gear 124 attached to gear 126. Although mounted on shaft 118, gear 126 is free to rotate with respect to said shaft. The shaft 118 has attached on one end thereof a link 128 which is, in turn, operably connected to the throttle 42. Fastened to cam 78, and effective to bias its movement toward a stop 129 is a spring 130. A rack 132 formed on a shaft 134 is in mesh with the gear 126. Shaft 134 has positioned on its opposite end a small expanded portion or land 135 adapted to reciprocate in a chamber 137. This chamber is located in a piston rod 139 which is connected to a piston 136 positioned in a cylinder 138. Servo pressure is supplied from a source, not shown, through a conduit 140 to the right side of the piston 136 and, through a conduit 142 having a restriction 144 and conduit 146 to the left side of piston 136. A conduit 148 extends conduit 146 and provides communication between the left side of piston 136 and with servo exhaust through a valve 150 controlled by a solenoid 152. Solenoid 152 receives its energization from main control 28 and is the speed lockout solenoid. The signal which it receives is responsive to engine rotational speed, and will prevent communication between the left side of piston 136 and the servo exhaust until the engine reaches a speed corresponding to point B of Figure 2. Upon reaching this speed the solenoid is deenergized, causing valve 150 to be moved in an opening direction thereby dumping this fluid pressure on the left side of piston 136 into the servo exhaust passage. Because of the action of restriction 144, the servo pressure is maintained against the right side of the piston 136 and this piston is caused to move toward the left. As it moves to the left it first moves away from land 135 of shaft 134 until land 135 comes in contact with a stop 154. It then carries with it shaft 134 and rack 132 thereby rotating gear 126. Movement of shaft 134 toward the left is limited by means of a stop 156 which abuts against a stationary member 158. The system just described operates as follows:

Under idle operation of engine 10, land 135 will be positioned as illustrated with respect to chamber 137 and piston 136 will be positioned toward the right end of cylinder 138. Upon a movement of the throttle link 128 in the increasing direction as shown by the arrow the shaft 118 will also be moved in that direction. The cam 78 however, will not move inasmuch as it is restrained by means of the spring 130. The gear 120 then, remains stationary and gear 122 begins to rotate around the shaft carrying with it the gear 124 and hence the gear 126. As gear 126 moves, it carries the rack 132 and hence the shaft 134 to the right. Inasmuch as land 135 is initially positioned near the left end of chamber 137, movement of the rack 132 to the right will result only in travel of this land toward the stop 154. This initial throttle burst, then, results only in a lost motion action which is ineffective to move shaft 74. Upon the arrival of engine 10 at the rotational speed corresponding to point B on Figure 2, the solenoid 152 is deenergized and the servo pressure on the left side of piston 136 is dumped to the exhaust. This causes the piston 136 to travel to the left, picking up any remaining lost motion and further, carrying rack 132 to the left and rotating gear 126 in a counterclockwise direction. Under this condition, the throttle link 128 is maintained in a stationary position and rotation of gear 126 causes rotation of gear 124, gear 122 and gear 120. This causes the cam 78 to be rotated against the action of spring 130 thereby moving shaft 74 in a direction to request a reduced area. Once the speed lockout piston 136 is actuated to the left, movement of cam 78 becomes directly responsive to changes in the throttle request.

The foregoing description deals with a typical differential system adaptable to the applicant's control system. It will be recognized by those skilled in the art that the nature of a differential gearing system is such that input forces may be supplied and output forces received from the various members in a number of ways other than that described.

Operation

Operation of the present control may be best understood from consideration of a typical acceleration. It will be assumed that the throttle 42 is moved in an opening direction an amount sufficient to call for full non-afterburning operation. Under these conditions, the engine will be accelerated under control of the main control unit 28. The increasing throttle request simply takes up lost motion in the differential mechanism previously described and no change is produced in the exhaust area mechanism until the engine reaches a speed corresponding to point B of Figure 2. At that point, the speed lockout solenoid is deenergized and the link 74 is moved in a direction to initiate closing of the tailgate structure 24. As shown, the lower end of lever 72 will move to the left, pivoting around its upper end and pulling carriage 80 and servo valve 82 to the left. This will cause the pressure on the left side of piston 40 to be dumped into the exhaust channel 92 and the nozzle mechanism 24 is moved in a closing direction under the influence of full servo pressure against piston 40. Closing of the tailgate structure 24 then proceeds very rapidly down curve B—C of Figure 2 until it reaches the minimum position indicated by line C—D. As tailgate 24 closes, it transmits a feedback signal to the top end of lever 72 through feedback linkage 50 causing servo valve 82 to be moved back to null position for the new position of the tailgate. Should an overtemperature condition prevail in the tailgate of engine 10, the main control will produce a temperature error signal of a proper polarity to cause the motor 93 to rotate in such direction that the threaded member 98 is moved to the right thereby enabling servo pressure from conduit 39 to be placed in communication with conduit 38 and thereby causing the higher pressure to be exerted against the left side of piston 40. The system will stabilize at an area somewhere in the shaded region of Figure 2 depending upon when the temperature sensed by thermocouple 48 returns to safe value. Upon a deceleration, the throttle will be rotated in the closing direction and the control system will operate on the built-in mechanical schedule A—B—C—D. Assuming operation along line C—D, a throttle cut will result in increasing the area rather rapidly to that defined by line A—B. Under these conditions the shaft 74 will be caused to move to the right, moving servo valve 82 to the right and causing high servo pressure in line 39 to be transmitted through ports 86 and 88 into conduit 38 against the left side of piston 40. Movement of the exhaust area mechanism 24 will result in movement of the feedback cable 50 which operates through its linkage previously described to rotate lever 72 about its lower end to reestablish a null in the system at a new and increased tailgate area.

Upon the occurrence of an emergency situation, it is desired that the exhaust nozzle area be reduced to its minimum value in order to avoid a loss of engine power at a critical time. Should a loss in electrical power occur which would require emergency operation solenoid valve 114 will be deenergized causing the emergency valve 100 to be moved to its most leftward position, and resulting in movement of tailgate members 24 in the closing direction as previously described. Should the pilot desire to operate the afterburner control 30 and supply fuel to the afterburner manifold 22, the resulting increase in tailpipe temperature will be sensed very rapidly by thermocouple 48 which supplies through the main control 28 an overtemperature signal to the exhaust area control resulting in an immediate opening of the tailgate 24.

While only one embodiment is shown and described herein, it will be appreciated that the invention is not to be limited to the embodiment shown herein and that modifications may be made to suit the requirements of specific applications.

I claim:

1. An exhaust area varying mechanism for a gas turbine engine comprising means for varying the effective area of the exhaust nozzle, servo valve means for controlling the operation of the area varying means, and means for controlling the effective position of said servo valve means including a linkage system, a spring-loaded cam operably attached to one of the links in said system, a throttle member, a differential gearing structure operably positioned between said cam and said throttle member, and engine speed responsive means connected to said gearing structure such that movement of said throttle member is transmitted to said cam only when engine speed reaches a desired value.

2. An exhaust area varying mechanism for a gas turbine engine comprising means for varying the effective area of the exhaust nozzle, servo valve means for controlling the operation of said area varying means, and means for controlling the effective position of said servo valve means including a linkage system, a spring-loaded cam attached to one of the links in said system, a shaft upon which said cam is mounted, said cam being rotatable with respect to said shaft, a throttle member attached to said shaft, a differential gearing structure mounted on said shaft, and means responsive to an engine operating condition connected to said gearing structure such that movement of said throttle member is transmitted to said cam only when said engine operating condition reaches a desired value.

3. An exhaust area varying mechanism for a gas turbine engine comprising means for varying the effective area of the exhaust nozzle, servo valve means for controlling the operation of said area varying means, and means for controlling the effective position of said servo valve means including a linkage system, a spring-loaded cam attached to one of the links in said system, a shaft upon which said cam is mounted, said cam being rotatable with respect to said shaft, a throttle member attached to said shaft, a gear mounted on said shaft but rotatable with respect to said shaft; first, second, and third gear members attached to said cam, said shaft, and said gear respectively; a rack engaged with said gear, a cylinder connected to a source of servo pressure and to servo exhaust, a piston in said cylinder adapted to drive said rack through a lost motion link, and a speed-responsive valve adapted to control communication between said cylinder and servo exhaust, said gear member being arranged in a differential gearing structure such that movement of the throttle member in a direction to request a decrease in an exhaust area is effective only when said piston has moved in a direction to absorb substantially all of said lost motion.

4. An exhaust area varying mechanism for a gas turbine engine comprising means for varying the effective area of the exhaust nozzle, servo valve means for controlling the operation of said area varying means, and means for controlling the effective position of said servo valve means including a linkage system, a spring-loaded cam attached to one of the links in said system, a shaft upon which said cam is mounted, said cam being rotatable with respect to said shaft, a throttle member attached to said shaft, a gear mounted on said shaft but rotatable with respect to said shaft, a rack engaged with said gear and engine speed-responsive means connected to said rack through a lost motion connection, and a differential gearing structure mounted on said shaft between said cam and said gear arranged in such manner that movement of the throttle member in a direction to request a decrease in exhaust area is effective only when said speed-responsive means has acted to absorb substantially all of said lost motion.

5. An exhaust area varying mechanism for a gas turbine engine comprising means for varying the effective area of the exhaust nozzle including a cylinder, a piston in said cylinder, a source of high pressure servo fluid operable against one side of said piston, a servo valve for controlling the pressure against the other side of said piston, a first conduit conducting high pressure servo fluid to said servo valve, a second conduit communicating said servo valve with said other side of said piston, a third conduit communicating said servo valve with servo exhaust, and means for controlling the effective position of said servo valve including a lever, a first shaft pinned to one end of said lever, a second shaft pinned to the other end of said lever, a carriage structure operatively engaged with said lever between said shafts, said carriage structure including a threaded member operatively connected to said servo valve, a gear-driven member threadedly engaged with said threaded member, an electric motor engaged with said gear-driven member, means supplying said electric motor with signals representative of overtemperatures in the engine thereby moving said servo valve in a direction to cause said mechanism to be moved in an opening direction, a pilot actuated throttle member, throttle actuated means for introducing an area request on said first shaft, engine speed responsive means for making said throttle actuated means ineffective over part of the speed range of the engine, an area position feedback linkage connected between said area varying means and said second shaft, an emergency valve in communication with said first, second and third conduits and operatively positioned between said servo valve and said cylinder, each end of said emergency valve being exposed to high pressure servo fluid, a passage extending axially through said emergency valve, a restriction in said passage, passage means communicating one side of said emergency valve with servo exhaust, and a solenoid operated valve for controlling said passage means such that said passage means is closed under normal operation and is open upon de-energization of said solenoid whereby said emergency valve is subjected to a pressure differential forcing it to assume a position wherein said second and third conduits are placed in communication.

6. An exhaust area varying mechanism for a gas turbine engine comprising means for varying the effective area of the exhaust nozzle, servo valve means for controlling said area varying means, and means for controlling the effective position of said servo valve means including a lever, a first motion transmitting means attached to one end of said lever, a second motion transmitting means attached to the other end of said lever, a carriage structure operatively engaged with said lever between said motion transmitting means, said carriage structure including a threaded member operatively connected to said servo valve, a gear-driven member threadedly engaged with said threaded member, an electric motor engaged with said gear-driven member, means supplying said electric motor with signals representative of overtemperatures in the engine, thereby moving said servo valve means in a direction to cause said mechanism to be moved in an opening direction, a pilot actuated throttle member, throttle actuated means for introducing an area request on said first motion transmitting means, engine speed responsive means for making said throttle actuated means ineffective over part of the speed range of the engine, an area feedback linkage connected between said area varying means and said second motion transmitting means, an emergency valve operatively positioned between said servo valve means and said area varying means, each end of said emergency valve being exposed to high pressure servo fluid, a passage extending axially through said valve, a restriction in said passage, passage means communicating one side of said emergency valve with servo exhaust, and a solenoid operated valve for controlling said passage means such that said passage means is closed under normal operation and opened under de-energization of said solenoid whereby said emergency valve is subjected to a pressure differential forcing it to assume a position wherein said area varying mechanism is maintained at its minimum area position.

7. An exhaust area varying means as set forth in claim 6 having an emergency valve operatively positioned between said servo valve means and said area varying means, each end of said emergency valve being exposed to high pressure servo fluid, a passage extending axially through said emergency valve, a restriction in said passage, passage means communicating one side of said emergency valve with servo exhaust, and a solenoid operated valve for controlling said passage means such that said passage means is closed under normal operation and is opened upon de-energization of said solenoid whereby said emergency valve is subjected to a pressure differential forcing it to assume a position wherein said area varying mechanism is maintained at its minimum area position.

8. An exhaust area varying mechanism for a gas turbine engine as set forth in claim 6 wherein said means for introducing an area request includes a shaft upon which said throttle member is mounted, a cam connected to said first motion transmitting means mounted on said shaft but rotatable with respect to said shaft, a first gear member integral with said cam, a resilient member connected to said cam in such manner as to oppose a request for decreased exhaust area, a second gear member mounted on said shaft, a gear mounted on said shaft but rotatable with respect to said shaft, a third gear member integral with said gear, a rack engaged with said gear, a cylinder connected to a source of servo pressure and to servo exhaust, a piston in said cylinder adapted to drive said rack through a lost motion link, a valve connected to said engine speed responsive means adapted to control communication between said cylinder and servo exhaust, said gear members being arranged in a differential gearing structure such that movement of the throttle member in a direction to request a decrease in exhaust area is effective only when said piston has moved in the direction to absorb substantially all of said lost motion.

9. An exhaust area varying mechanism for a gas turbine engine as set forth in claim 6 wherein said means for introducing an area request includes a shaft upon which said throttle member is mounted, a cam connected to said first motion transmitting means mounted on said shaft but rotatable with respect to said shaft, a gear mounted on said shaft but rotatable with respect to said shaft, a rack engaged with said gear and connected to said engine speed-responsive means through a lost motion connection, a differential gearing structure mounted on said shaft between said cam and said gear arranged in such manner that movement of the throttle member in a direction to request a decrease in exhaust area is effective only when said speed-responsive means has acted to absorb substantially all of said lost motion, and the resilient member connected to said cam in such a manner as to oppose request for decreased exhaust area.

10. An exhaust area varying mechanism for a gas turbine engine as set forth in claim 6 wherein said means for introducing an area request includes a shaft, a throttle member, a cam mounted on said shaft but rotatable with respect thereto, said cam being operably connected to said first motion transmitting means, a differential gearing structure operably positioned between said cam and said throttle member, said gearing structure being connected to said engine speed-responsive means such that movement of said throttle member is transmitted to said cam only when engine speed reaches a desired value, and the resilient member connected to said cam in such manner as to oppose movement transmitted by said throttle member.

11. An exhaust area varying mechanism for a gas turbine engine as set forth in claim 6 wherein said means for introducing an area request includes a throttle member, a shaft, a cam mounted on said shaft and operably connected to said first motion transmitting means, a differential gearing structure operably positioned between said cam and said throttle member, said gearing structure connected to said engine speed responsive means such that movement of said throttle member is transmitted to said cam only when engine speed reaches a desired value, and a resilient member connected to said cam in such manner as to oppose movement transmitted by said throttle member.

12. An exhaust area varying mechanism as set forth in claim 6 wherein said means for controlling the effective position of said servo valve means also includes motion translating means for positioning said servo valve independent of said linkage system, electric motor means for actuating said motion translating means, and means for producing an electric signal upon the occurrence of an overtemperature condition in said engine for actuating said electric motor in a direction to cause said servo valve means to be moved in a direction causing said area varying mechanism to be opened.

References Cited in the file of this patent

UNITED STATES PATENTS

| | | |
|---|---|---|
| 1,831,072 | Lee | Nov. 10, 1931 |
| 2,683,348 | Petry | July 13, 1954 |
| 2,705,864 | Peters | Apr. 12, 1955 |
| 2,706,383 | Jacobson | Apr. 19, 1955 |
| 2,765,143 | Best | Oct. 2, 1956 |

FOREIGN PATENTS

| | | |
|---|---|---|
| 1,061,753 | France | Apr. 15, 1954 |